3,234,144
PROCESS FOR INHIBITING CORROSION
Edward L. Morehouse, Snyder, N.Y., assignor to Union Carbide Corporation, a corporation of New York
No Drawing. Filed Mar. 26, 1962, Ser. No. 182,614
13 Claims. (Cl. 252—389)

This application is a continuation-in-part of application Serial No. 777,561, filed December 2, 1958, now abandoned.

This invention relates to a process for retarding corrosion that involves employing organosilicon compounds as corrosion inhibitors.

The corrosion of metals that are in contact with static or moving water is a widespread problem that is encountered in a variety of industrial processes (e.g. such processes as the removal of scale from metal surfaces using acid solutions which may attack the base metal) and in a variety of industrial apparatus (e.g. boilers, cooling systems and liquid storage tanks).

Hence, a wide variety of inhibitors (i.e. compounds that retard the corrosion of metals) have been added to water that comes in contact with metals in order to reduce the corrosion of the metals. Such known inhibitors include both organic materials and inorganic materials. Illustrative of the organic materials that have been used as inhibitors are: guanidine, colloids, citrates, coal tar derivatives, petroleum bases, thiocyanates, peptones, phenols, thioureas, tannin, quinoline, morpholine, triethanolamine, tartrates, glycol mono-ricinoleate, organic nitrites, amines, mercaptans, sulfonated hydrocarbons, fatty oils, organic oils and soaps. Illustrative of the inorganic materials that have been used as inhibitors are: sulfates, sulfides, fluorides, hydrogen peroxide and the alkali metal chromates, nitrites, phosphates, borates, tungstates, molybdates, carbonates and silicates. Although the above-mentioned inhibitors have been found useful in some instances, they suffer from various disadvantages that limit the scope of their utility.

Thus, some known inhibitors are useful only in certain liquids or in protecting certain metals. By way of illustration, chromates are not useful in aqueous alcohol solutions because they promote the decomposition of the alcohol. As a further illustration, organic amines although useful as inhibitors for ferrous metals, promote the corrosion of copper and copper alloys.

Furthermore, water that contains known inhibitors often attacks organic materials with which it comes into contact (e.g. inhibited coolants in internal combustion engines sometimes attack the rubber hoses that form part of the cooling system) or retains its non-corrosive properties only over a narrow temperature range or foams excessively.

It is an object of this invention to provide an improved process for inhibiting the corrosion of metals that come in contact with water which is generally applicable to the protection of all of the metals used in industrial processes and apparatus.

Another object of this invention is to provide an improved process for inhibiting the corrosion of metals that come in contact with water which is generally applicable to both pure water and solutions containing water and water-soluble organic or inorganic compounds.

Other objects of this invention are to provide an improved process for inhibiting the corrosion of metals that come in contact with water which does not entail attack on organic materials (e.g. rubber) by the inhibited water, or the loss of the non-corrosive properties of the inhibited water outside a narrow temperature range or excessive foaming of the water.

This invention provides an improved process for inhibiting the corrosion of metals that come in contact with water which involves adding to the water, as an inhibitor, an organosilicon compound containing an amino group linked to a silicon atom by a divalent hydrocarbon group containing at least three carbon atoms wherein the amino group is attached to at least the third carbon removed from the silicon atom.

The organosilicon inhibitors that are used in this invention are compounds, including both hydrocarbonoxysilanes (including alkoxysilanes and aroxysilanes) and siloxanes (including homopolymeric and copolymeric siloxanes), containing an amino group that is linked to a silicon atom through a divalent hydrocarbon group containing at least three carbon atoms wherein the amino group is attached to at least the third carbon removed from the silicon atoms. As used herein "hydrocarbonoxy" denotes a monovalent group composed of a monovalent hydrocarbon group linked to an oxygen atom (e.g. an $OR^7$ group where $R^7$ is a monovalent hydrocarbon group). These organosilicon inhibitors can be primary, secondary or tertiary amines, but they are preferably primary amines. These organosilicon inhibitors contain the group that is represented by the formula:

$$Z_2NRSi\equiv \qquad (1)$$

wherein R is a divalent hydrocarbon containing at least three successive carbon atoms; the $Z_2N-$ group is attached to at least the third carbon removed from the silicon atom; Z is a hydrogen atom, an unsubstituted or a substituted monovalent hydrocarbon group, or a divalent group that is derived from an oxirane compound by the opening of the oxirane ring and that connects the nitrogen atom to the silicon atoms by a carbon to carbon to oxygen linkage; and the free valences of silicon link the silicon atom to at least one alkoxy or aroxy group (i.e. when the inhibitor is a hydrocarbonoxysilane such as an alkoxysilane or an aroxysilane) or to at least one siloxy group (i.e. when the inhibitor is a siloxane). The substituents on the substituted monovalent hydrocarbon groups represented by Z can be hydroxyl, amino, amido, hydrocarbonoxy, ester or cyano groups. The free valences of the silicon atom in Formula 1 can link the silicon atom to from 0 to 2 monovalent hydrocarbon groups, divalent groups derived from oxirane compounds described above, or $NH_2C_nH_{2n}-$ groups where $n$ has a value of at least 3. As used herein an "oxirane compound" is a compound containing at least one oxirane ring structure, i.e. a structure represented by the formula:

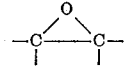

Typical of the groups represented by R in Formula 1 are: (a) groups containing an arylene group linked to an alkylene group (e.g. where Formula 1 represents the group $Z_2NArC_aH_{2a}Si\equiv$ wherein $a$ has a value from 1 to 4 an Ar is an aryl group, preferably a phenyl group); (b) groups containing an alkylene group linked to an arylene group (e.g. where Formula 1 represents the group $Z_2NCH_2C_6H_4Si\equiv$); (c) alkylene groups (e.g. where Formula 1 represents the group $Z_2NC_nH_{2n}Si\equiv$ wherein $n$ has a value of at least 3 and preferably from 3 to 5); and (d) arylene groups (e.g. the meta- and paraphenylene groups).

Typical of the groups represented by Z in Formula 1 are: (a) the hydrogen atom; (b) monovalent hydrocarbon groups (e.g. aryl groups such as the phenyl group, alkyl groups such as the methyl, ethyl and propyl groups and aralkyl groups such as the beta-phenylethyl group); (c) substituted alkyl groups containing at least two carbon atoms (e.g. groups represented by the formulae $H_2NR^4-$, $HOR^4-$, $NCR^4-$, $H_2NCOR^4-$ and $R^2OOCR^4$— wherein $R^4$ is an alkylene group containing at least two, and preferably from 2 to 10, carbon atoms such as the ethylene, 1,3-propylene and 1,4-butylene groups and $R^2$ is a monovalent hydrocarbon group such as defined above for Z); (d) a divalent group that is derived from an oxirane compound by the opening of the oxirane ring which connects the nitrogen atom and the silicon atom in Formula 1 through a carbon to carbon to oxygen linkage, that is composed only of carbon, hydrogen and oxo oxygen, and that is linked to the nitrogen atom of Formula 1 by a carbon to nitrogen bond and to the silicon atom of Formula 1 by an oxygen to silicon bond to provide a cyclic structure (i.e. a group denoted hereinafter as an —$OR^3$— group where $R^3$ is a divalent hydrocarbon or a divalent hydrocarbonoxy-hydrocarbon group); and (e) a hydroxyl-substituted monovalent group derived from an oxirane compound by the opening of the oxirane ring (denoted hereinafter as an $HOR^3$— group). The monovalent hydrocarbon groups represented by Z in Formula 1 preferably contain from 1 to 10 carbon atoms. In Formula 1, Z may be the same or different.

Silanes that are useful as inhibitors in this invention contain the group that is represented by Formula 1 and may be more specifically depicted by Formula 2.

$$Z_2NRSiX_{3-b-f}^{R_b^5} \qquad (2)$$

wherein $R^5$ is a monovalent hydrocarbon group or a $NH_2C_nH_{2n}$— group, X is an alkoxy group (such as a methoxy or ethoxy group) or an aroxy group (such as a phenoxy group), b has a value of from 0 to 2, n, R and Z have the above-defined meanings, f has a value from 0 to 2 and represents the number of the above-defined divalent groups represented by Z, $(3-b-f)$ has a value from 1 to 3, and Z is preferably a hydrogen atom. Illustrative of the monovalent hydrocarbon groups represented by $R^5$ in Formula 2 are the alkyl groups (e.g. the methyl, ethyl, propyl and butyl groups), the aryl groups (e.g. the phenyl group) and the aralkyl groups (e.g. the beta-phenylethyl group). The monovalent hydrocarbon groups represented by $R^5$ preferably contain from 1 to 10 carbon atoms.

Illustrative of the preferred silanes represented by Formula 2 (i.e. where both groups represented by Z are hydrogen atoms) are gamma-aminopropyltriethoxysilane, gamma - aminopropyltripropoxysilane, gamma - aminopropyl(methyl)diethoxysilane, gamma-aminopropyl(ethyl)diethoxysilane, gamma-aminopropyl(ethyl)diethoxysilane, gamma-aminopropyl(phenyl)diethoxy silane, delta-aminobutyltriethoxysilane, delta-aminobutyl(methyl)diethoxysilane, delta-aminobutyl(ethyl)diethoxysilane, delta-aminobutyl(phenyl)diethoxysilane and epsilon - aminopentyltriethoxysilane. Illustrative of the silanes represented by Formula 2 where at least one group represented by Z is a group derived from an epoxy compound (i.e. the above-defined —$OR^3$— and $HOR^3$— groups) are those silanes produced by reacting one mole of gamma-aminopropyltriethoxysilane and one or two moles of a hydrocarbon compound containing at least one oxirane ring (e.g. ethylene oxide, 1,2-propylene oxide, styrene oxide and dipentene dioxide) or a hydrocarbonoxy-hydrocarbon compound containing at least one oxirane ring (e.g. 1,2-epoxy-3-isopropoxy-propane and phenyl glycidyl ether). Illustrative of the silanes represented by Formula 2 wherein at least one group represented by Z is a monovalent hydrocarbon group, are N-methyl-gamma-aminopropyltriethoxysilane, N,N-dimethyl-gamma-aminopropyltriethoxysilane, and N-N-dimethyl - delta - aminobutyl(methyl)diethoxysilane. Illustrative of the silanes represented by Formula 2 where Z is an alkyl group containing an amino substituent (i.e. the above-defined $NH_2R$— group) are N-gamma-aminopropyl-delta-aminobutyltriethoxysilane and N - beta - aminoethyl - gamma-aminopropyltriethoxysilane. Illustrative of the silanes represented by Formula 2 where one group represented by Z is an alkyl group containing a hydroxyl substituent (i.e. the above-identified $HOR^4$— group) are N-beta-hydroxylethyl - gamma - aminopropyltriethoxysilane, N-beta - hydroxyethyl - delta - aminobutyl(methyl)diethoxysilane. Illustrative of the silanes represented by Formula 2 where Z represents an alkyl group containing a cyano-substituent group (i.e. the above-defined $NCR^4$— group) are N - beta - cyanoethyl - gamma - aminopropyltriethoxysilane N - beta-cyanoethyl - delta - aminobutyltriethoxysilane and N-beta-cyanoethyl-delta-aminobutyl(methyl) diethoxysilane. Illustrative of the silanes represented by Formula 2 where Z represents an alkyl group containing an ester substituent group (i.e. the above-defined $R^2OOCR^4$— group) are N-beta-carbethoxyethyl-gamma-aminopropyltriethoxysilane, N - beta - carbethoxyethyl-delta - aminobutyl(methyl)diethoxysilane and N,N - dicarbethoxyethyl - gamma - aminopropyltriethoxysilane. Illustrative of the silanes represented by Formula 2 where R is an arylene group are p-aminophenyltriethoxysilane and m-aminophenyltriethoxysilane. Illustrative of silanes represented by Formula 2 wherein R is an arylene group linked to an alkylene group are beta-(p-aminophenyl)ethyltriethoxysilane, p-aminophenylmethyltriethoxysilane, beta - p - aminophenylethyl(methyl)diethoxysilane, beta-(aminophenyl)-ethyldimethylethoxysilane, beta-(aminotolyl)-ethyltriethoxysilane and p-aminophenylmethyltriethoxysilane. Illustrative of silanes represented by Formula 2 wherein R is an alkylene group linked to an arylene group are meta- and para-aminomethylphenyltriethoxysilane. Illustrative of silanes represented by Formula 2 wherein $R^5$ is a $NH_2C_nH_{2n}$— group are bis(gamma-aminopropyl)diethoxysilane, delta - amino - beta - methylbutyl epsilon-aminopentyldiethoxysilane (i.e.

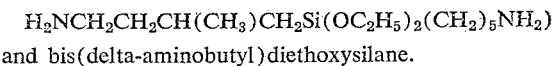

$$H_2NCH_2CH_2CH(CH_3)CH_2Si(OC_2H_5)_2(CH_2)_5NH_2$$

and bis(delta-aminobutyl)diethoxysilane.

Siloxanes that are useful as inhibitors in this invention contain the group that is represented by Formula 1 and may be more specifically described as containing one or more of the siloxane groups represented by Formula 3.

$$Z_2'NR\overset{R_b^5}{\underset{}{Si}}O_{\frac{3-b}{2}} \qquad (3)$$

wherein R, $R^5$ and b have the above-defined meanings and Z' has the meanings defined above for Z other than the —$OR^3$— group. In Formula 3, Z' is preferably a hydrogen atom. Illustrative of the preferred siloxane groups represented by Formula 3 (i.e. where both groups represented by Z' are hydrogen atoms) are the beta-(aminophenyl)ethylsiloxy, beta - (aminotolyl) - propylsiloxy, gamma - aminopropylsiloxy, gamma - aminopropyl(methyl)siloxy, gamma-aminopropyldimethylsiloxy, delta-aminobutylsiloxy, delta-aminobutyl(methyl)siloxy, delta-aminobutyldimethylsiloxy, epsilon - aminopentylsiloxy groups and the like. Illustrative of the siloxane groups represented by Formula 3, wherein at least one group represented by Z' is a group derived from an epoxy compound (i.e. the above-defined $HOR^3$— group) are the siloxane groups derived by reacting one mole of a siloxane containing one gamma-aminopropylsiloxy or delta-aminobutylsiloxy group and one or two moles of a hydrocarbon compound containing at least one oxirane ring (e.g. ethylene oxide, 1,2-propylene oxide, styrene oxide and dipentene dioxide) or a hydrocarbonoxy-hydrocarbon compound containing at least one oxirane ring (e.g. 1,2-epoxy-3-isopropoxy-propane and phenyl glycidyl ether). Illustrative of the siloxane groups represented by Formula 3 where at least one group represented by Z' is a monovalent hydrocarbon group are the N-methyl-gamma-aminopropylmethylsiloxy, N,N - dimethyl - delta - aminobutyl(methyl)siloxy, and N,N-dimethyl-gamma-aminopropylsiloxy groups. Illustrative of the siloxane groups represented by Formula 3 where one of the groups represented by Z' is an amino-substituted alkyl group (i.e. the above-defined $H_2NR^4$— group) are the N-beta-aminoethyl - gamma - aminopropyl(methyl)siloxy, N - gammaaminopropyl-delta-aminobutylsiloxy and N-beta-aminoethyl - delta - aminobutylmethylsiloxy groups. Illustrative of the siloxane groups represented by Formula 3 where one of the groups represented by Z' is a hydroxyl-substituted alkyl group (i.e. the above-defined $HOR^4$— group) are N - beta-hydroxyethyl - delta - aminobutyl (methyl)siloxy and N,N - di(beta - hydroxyethyl) - delta-aminobutyl(methyl)siloxy groups. Illustrative of the siloxane groups represented by Formula 3 where Z' represents a cyano-substituted alkyl group (i.e. the above-defined $NCR^4$— group) are N-beta-cyanoethyl-gamma-aminopropyl(methyl)siloxy, N - beta - cyanoethyl - delta-aminobutylsiloxy, and N - beta - cyanoethyl - delta-amino-butyl(methyl)siloxy groups. Illustrative of the siloxane groups represented by Formula 3 where Z' represents an alkyl group containing an ester substituent group (i.e. the above-defined $R^2OOCR^4$— group) are the N-beta-carbethoxyethyl-gamma-aminopropyl(methyl)siloxy, N,N-dicarbethoxyethyl-gamma-aminopropylsiloxy and N-beta-carbethoxyethyl-delta-aminobutyl(methyl)siloxy groups. Illustrative of siloxane groups represented by Formula 3 where R is an arylene group are the para-aminophenylsiloxy and meta-aminophenylsiloxy groups. Illustrative of siloxane groups represented by Formula 3 where R is an arylene group linked to an alkylene group are the beta-(p-aminophenyl)ethylsiloxy, beta-(p-aminophenyl)ethyl (methyl)siloxy, beta-(p-aminophenyl)ethyldimethylsiloxy, beta-(p-aminotolyl)ethylsiloxy and p-aminophenylmethyldimethylsiloxy groups. Illustrative of solioxane groups represented by Formula 3 where R is an alkylene group linked to an arylene group are the meta- and para-aminoethylphenylsiloxy groups. Illustrative of the siloxane groups represented by Formula 3 wherein $R^5$ is a

group are the bis(gamma-aminopropyl)siloxy, the bis (delta - aminobutyl)siloxy and the delta - amino - beta-methylbutyl epsilon-aminopentylsiloxy groups i.e.,

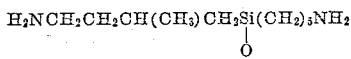

Silanes represented by Formula 2 and siloxanes containing siloxane groups represented by Formula 3 and processes for their production are disclosed in U.S. patent applications Serial Nos. 615,480, filed October 12, 1956, and now abandoned; 655,506, filed April 29, 1957, and now abandoned; 615,463, filed October 12, 1956, and now abandoned; 727,527, filed April 10, 1958, and now abandoned; 668,621, filed June 28, 1957, now U.S. Patent No. 2,907,784, and 727,534, filed April 10, 1958, and now abandoned.

Organosilicon inhibitors containing the

group can be produced by reducing compounds containing the $NCC_6H_4Si\equiv$ group. By way of illustration, p-aminomethylphenyltriethoxysilane can be produced by forming a mixture of p-cyanophenyltriethoxysilane dissolved in toluene, hydrogen and a catalytic amount of nickel supported on alumina and heating the mixture to a temperature of about 150° C. to cause the p-cyanophenyltriethoxysilane and the hydrogen to react to produce para-aminomethylphenyltriethoxysilane.

Organosilicon compounds containing a group represented by Formula 1 where one of the free valences of silicon atom is attached to a $H_2NC_nH_{2n}$— group can be produced by processes that include reducing the corresponding cyano compounds. Thus, organosilicon compounds containing two aminoalkyl groups attached to the same silicon atom can be produced by known reducing processes employing, as starting materials, organosilicon compounds containing two cyanoalkyl groups attached to the same silicon atom. Suitable starting organosilicon compounds containing two cyanoalkyl groups attached to the same silicon atom and processes for their production are disclosed in United States patent applications Serial Nos. 555,203, filed December 23, 1955, and now abandoned, and 555,208, filed December 23, 1955, now U.S. Patent No. 2,908,700.

Siloxanes that are useful as inhibitors in this invention includes homopolymeric compounds containing only one type of siloxane group represented by Formula 1 (or more specifically by Formula 3). Useful siloxanes also include copolymeric compounds that contain: (a) two or more types of siloxane groups represented by Formula 3; or (b) one or more of the latter-mentioned siloxane groups and also one or more siloxane groups represented by the formula:

wherein $R^6$ is a monovalent hydrocarbon group and $e$ has a value from 1 to 3. Illustrative of the monovalent hydrocarbon groups represented by $R^6$ in Formula 4 are the alkyl groups (e.g. the methyl, ethyl, propyl and butyl group), the aryl groups (e.g. the phenyl group), the aralkyl groups (e.g. the phenylethyl group), the alkenyl groups (e.g. the vinyl and the allyl groups), the cyclo alkenyl (e.g. the cyclohexenyl group), and the cycloalkyl groups (e.g. the cyclohexyl group). Preferably, these monovalent hydrocarbon groups contain up to ten carbon atoms. Illustrative of the groups represented by Formula 4 are the methylsiloxy, dimethylsiloxy, trimethylsiloxy, ethyl(vinyl)siloxy, beta-phenylethylsiloxy, diphenylsiloxy, phenyl(ethyl)methylsiloxy and diethylsiloxy groups.

The siloxanes that are useful in this invention as inhibitors can have a linear, cyclic or crosslinked structure or combination of these structures. The siloxanes can contain alkoxy or hydroxyl groups bonded to silicon and $SiO_2$ groups.

Illustrative of the siloxane homopolymers that are useful as inhibitors in this invention are gamma-aminopropyl(methyl)siloxane cyclic trimer and tetramer, delta-aminobutyl(methyl)siloxane cyclic trimer and tetramer, linear hydroxy end-blocked delta-aminobutyl(methyl) polysiloxanes, gamma - aminopropylpolysiloxanes, bis (delta - aminobutyl)tetramethyldisiloxane, and delta-aminobutylpolysiloxane.

Illustrative of the siloxane copolymers that are useful as inhibitors in this invention are bis(trimethylsiloxy) gamma-aminopropyl(methyl)trisiloxane, copolymers containing dimethylsiloxy and gamma-aminopropyl(methyl) siloxy or delta-aminobutyl(methyl)siloxy groups, copolymers containing gamma-aminopropylsiloxy and phenylsiloxy, methylsiloxy or vinylsiloxy groups, copolymers containing delta-aminobutyl siloxy and phenylsiloxy groups of amylsiloxy groups, copolymers containing N,N-di(beta-hydroxyethyl) - delta - aminobutyl(methyl)siloxy and dimethylsiloxy groups.

These useful copolymeric inhibitors can be produced by the cohydrolysis and co-condensation of silanes represented by Formula 2 and silanes represent by the formula:

wherein $R^6$ and $e$ have the meanings defined for Equation 4 and X has the meaning defined for Equation 2. Illustrative of silanes represented by Formula 5 are methyltriethoxysilane, dimethyldiethoxysilane, trimethylethoxysilane, phenyltriethoxysilane, ethyltriethoxysilane, vinyltriethoxysilane, amyltriethoxysilane, ethylvinyldiethoxysilane, diethyldiethoxysilane and diphenyldiethoxysilane.

Preferably, the organosilicon inhibitors contain an amino group to silicon atom ratio of at least 1:25 and most desirably from 1:2 to 2:1. These organosilicon inhibitors, as contrasted with other organosilicon compounds, were found to be characterized by their greater solubility in alcohols, especially ethanol. The solubility of these inhibitors is at least about 1 part by weight per 100 parts by weight of ethanol but the most useful inhibitors are soluble to the extent of about 10 parts by weight per 100 parts by weight of ethanol.

The amount of the organosilicon compound used as an inhibitor in this invention will vary widely from case to case depending upon the temperature, the type of metal or metals in contact with the water, the pH of the water, the velocity of the water, solutes or other materials in the water, and prior treatment or corrosion of the metal and the specific results desired. In general, amounts of the organosilicon inhibitor of from .0001 part to 10 parts by weight per 100 parts by weight of the liquid are useful but amounts of the organosilicon inhibitor from 0.001 part of 3.0 parts by weight per 100 parts by weight of the liquid are preferred. The above ranges are given to indicate the generally useful and preferred amounts of the organosilicon inhibitor and may be departed from, though it is not usually desirable to do so since no advantage is gained thereby.

In the practice of this invention the organosilicon inhibitor is added to water or an aqueous solution and, for best results, the inhibitor is then uniformly dispersed throughout the water or the solution. Any suitable means can be used to disperse the inhibitor throughout the water or the solution. Thus, in the case of moving liquids that are in contact with the metal to be protected, the inhibitor employed in this invention can be added to the liquid while the liquid is in use and dispersion of the inhibitor throughout the liquid is achieved by the movement of the liquid. However, the inhibitor can be added to the liquid (prior to the use of the liquid in contact with the metal to be protected) and the inhibitor can be dispersed throughout the liquid by stirring the liquid. This latter procedure is preferred where the liquid is to be stored or where the liquid undergoes little movement when in use.

This invention is generally applicable to liquids that contain water. Suitable liquids are pure water, aqueous solutions containing inorganic solutes and solutions containing water and water soluble organic compounds, especially water soluble organic liquids. Illustrative of suitable aqueous solutions containing inorganic solutes are aqueous sodium and calcium chloride refrigerating solutions, acidified pickling solutions (e.g. aqueous sulfuric acid solution), corrosive well water or river water containing chlorides, carbonates and sulfates which may be used as process water in industry, and the like. Illustrative of suitable solutions containing water and a water soluble organic liquid are solutions containing water and monohydric or polyhydric alcohols (e.g. methanol, ethanol, propanol, ethylene glycol, propylene glycol and glycerol), hydroxyl and alkoxy end-blocked polyalkylene oxides (such as polyethylene oxide), sulfoxides (such as methyl sulfoxide), formamides (such as dimethyl formamide) or cyclic ethers free of olefinic unsaturation (such as tetrahydrofuran and dioxane) or the like. Suitable solutions containing water and a water soluble organic liquid should contain at least 0.1 part by weight, or preferably at least 5.0 parts by weight of water per 100 parts by weight of the water and the organic liquid.

This invention is generally applicable to the protection of all metals and alloys that are suitable for use in industrial processes and apparatus. Metals whose corrosion is retarded by the process of this invention include magnesium and the metals below magnesium in the electromotive series (e.g. aluminum, copper, chromium, iron, manganese, nickel, lead, silver, tin, beryllium and zinc) as well as alloys of such metals (e.g. brass, bronze, solder alloys, steel and the like). This invention is particularly applicable to the protection of brass, iron, copper and aluminum.

Compared with known processes for preventing corrosion of metals that are in contact with water, this invention provides numerous advantages. Thus, the inhibitors used in this invention can be added to a wide variety of aqueous solutions and inhibit the corrosion of a wide variety of metals. In addition, the inhibitors used in this invention are effective over a wide temperature range and these inhibitors do not cause the liquids in which they are employed to foam excessively. Furthermore, these inhibitors do not promote the decomposition of organic compounds present in the water nor do they attack organic materials with which the water may come into contact.

This invention is applicable to preventing the corrosion of metals that are cleaned by acid solutions or that are used in cooling coils, boilers, refrigeration and air conditioning equipment, heat exchange tubes, storage tanks for liquids, pipes, solvent containers, tank cars, ballast tanks containing sea water, and the like. This invention is particularly applicable to inhibiting the corrosion of the cooling systems of internal combustion engines in contact with aqueous alcohol anti-freeze compositions.

The improvements in corrosion inhibition resulting from the practice of the present invention were found and evaluated by both simple visual observations of corrosion in beaker tests and also more elaborate laboratory tests designed to simulate field conditions. In the examples given below, both types of evaluation tests were employed.

SHORT-TERM TESTS AT ROOM TEMPERATURE

This is a simple test for visual observation of corrosion on test specimens. The test specimen, comprising a metal strip which has been cleaned by scouring with ordinary household cleanser, flushed and dried, is immersed into an inhibitor-containing test liquid in a beaker. The liquid is aerated vigorously for twenty four (24) hours at room temperature. A control sample using a strip of similar metal in a similar liquid containing no inhibitor is run simultaneously. The extent of rusting is then noted and a corrosion rating is given on the scale: (A is nil or a trace amount of corrosion, B is small amount of corrosion, C is medium amount of corrosion and D is large amount of corrosion.

200-HOUR CORROSION TEST

This is a laboratory test of corrosion inhibitors. This test has proven over many years of use to be useful in evaluating inhibitors for use in water and aqueous alcohol anti-freeze solutions in hydraulic and heat transfer applications. The test involves immersing clear strips of metal (usually iron, aluminum, brass and copper) and a brass coupon on which is a spot of solder, composed of 50 wt.-percent lead and 50 wt.-percent tin, in the test fluid with heating and aeration for a period of 200 hours. After this exposure, the specimens are cleaned and corrosion of the metal strips is measured by weight loss in milligrams. The corrosion of the spot of solder on the brass coupon is given a rating (called solder spot rating, abbreviated SS in the examples) by visual inspection with a rating of 6 indicating little or no corrosion and a rating of 0 indicating very severe corrosion.

Each test unit consists of a 600 ml. glass beaker equipped with a reflux condenser and an aeration tube. The test specimens are cut from $\frac{1}{16}$ inch sheet stock usually with a total surface area of about nine (9) square inches. Test temperature is 180° F. and the aeration rate is 0.028 cubic foot per minute. Specimens are separated with Z-shaped glass rods and are covered with 350 cc. of solution. Except where otherwise indicated, water used in preparing test solutions has 100 parts per million added of each of bicarbonate, chloride, and sulfate ions. This gives an accelerated corrosion rate and is nearly equivalent to conditions encountered in actual practice. Duplicate tests are run simultaneously, and both values on the average values of weight loss, final pH and final RA (defined below) are given.

The reserve alkalinity of an alcohol-containing aqueous anti-freeze composition is a measure of the ability of the composition to resist a decrease in pH due to the presence of acidic materials. Reserve alkalinity (abbreviated "RA" in the examples) is determined by titrating a sample (about 10 cc.) of the composition with 0.1 aqueous hydrochloric solution. From the number of milliliters of the acid actually required to neutralize the sample, the number that would be required to neutralize 100 milliliters of the composition if it contained a water to alcohol ratio of 3:1 on a volume basis is computed and this latter number is the reserve alkalinity of the composition.

In the following examples, "BR" is used as an abbreviation for brass.

The following examples illustrate the present invention:

*Example I*

Using the short term test at room temperature, one gram of an ethanol solution containing 25 parts by weight of the indicated inhibitors per 100 parts by weight of ethanol was added to 30 milliliters of distilled water in a beaker. A strip of freshly scoured carbon steel was immersed in the solution and tested as described above. Table I below lists results recorded for the inhibitor tested. The results show the improvement resulting from the practice of this invention.

TABLE I

| Inhibitor: | Rating |
|---|---|
| Delta-aminobutylmethyl cyclic tetramer | A |
| A copolymer containing 10 parts by weight of gamma-aminopropylmethylsiloxy groups and 90 parts by weight of dimethylsiloxy groups per 100 parts by weight of the siloxane groups in the copolymer (M. Wt. 30,000) | B |
| None | D |

*Example II*

Using the short term test at room temperature, one-tenth gram (0.1 g.) of each of the indicated inhibitors used in this invention was added to 10 milliliters of ethylene glycol. This mixture was then diluted with 20 milliliters of water containing 100 p.p.m. each of chloride, carbonate and sulfate ions. The final concentration of inhibitor in the solution was 0.33 part by weight per 100 parts by weight of water and glycol. A strip of freshly scoured carbon steel was immersed in the solutions and the test conducted as described above. The inhibitors tested and results obtained are set forth in Table II below. The results show that good protection is obtained when any of the wide variety of organosilicon inhibitors containing a group represented by Formula 1 are used in this invention.

TABLE II

| Inhibitor: | Rating |
|---|---|
| Delta-aminobutylmethyldiethoxysilane | A |
| Delta-aminobutyltriethoxysilane | A |
| Gamma-aminopropylmethyl cyclic siloxanes (mixture) | A |
| Gamma-aminopropylmethyldiethoxysilane | A |
| Gamma-aminopropyltriethoxysilane | A |
| Bis(trimethylsiloxy) gamma-aminopropylmethyl silane | A |
| A copolymer containing 80 parts by weight of delta-aminobutylmethylsiloxy groups and 20 parts by weight of dimethylsiloxy groups per 100 parts by weight of the siloxane groups in the copolymer | B |
| Bis(delta-aminobutyl)tetramethyldisiloxane | A |
| N-beta-carbethoxyethyl-gamma-aminopropyltriethoxysilane | A |
| N-gamma-aminopropyl-delta-aminobutyltriethoxysilane | A |
| N-beta-cyanoethyl-delta-aminobutyltriethoxysilane | B |
| N,N-dicarbethoxyethyl gamma-aminopropyltriethoxysilane | C |
| None | D |

*Example III*

The 200-hour corrosion test was employed in this experiment. In these tests delta-aminobutyltriethoxysilane was used as an inhibitor in several different heat transfer liquids. The test fluid systems and results obtained are given in Part I of Table III below. In Part II of Table III, the effectiveness of delta-aminobutyltriethoxysilane is compared directly with a typical organic amine inhibitor (triethanolamine) in aqueous ethylene glycol to show the unexpected improvements in corrosion inhibition obtained with delta-aminobutyltriethoxysilane. There are two runs with each system. The results show that this invention is applicable to the protection of a wide variety of metals that come in contact with a wide variety of liquids.

TABLE III

| Liquid [1] | Inhibitor | Amount of inhibitor [2] | Corrosion wt. loss, mg./9 sq. in. [3] | | | |
|---|---|---|---|---|---|---|
| | | | Fe | Al | BR | Cu |
| PART I | | | | | | |
| Distilled water | Delta-aminobutyltriethoxysilane | 0.3 | 3 | 93 | 4 | 7 |
| Do | None | | 1,169 | 3 | 70 | 78 |
| 27 parts methanol, 73 parts water | Delta-aminobutyltriethoxysilane | 0.27 | 338 | 14 | 4 | 6 |
| Do | None | | 436 | 23 | 11 | 53 |
| 5% aqueous, NaCl solution | Delta-aminobutyltriethoxysilane | 0.3 | 328 | 386 | 74 | 41 |
| Do | None | | 299 | 681 | 119 | 427 |
| 33 parts dimethylsulfoxide, 67 parts water | Delta-aminobutyltriethoxysilane | 0.33 | 21 | 5 | 4 | 5 |
| Do | None | | 632 | 42 | 80 | 69 |
| 33 parts propylene glycol, 67 parts water | Delta-aminobutyltriethoxysilane | 0.33 | 100 | 26 | 4 | 3 |
| Do | None | | 974 | 77 | 237 | 215 |
| 33 parts ethylene glycol, 67 parts water | Delta-aminobutyltriethoxysilane | 0.33 | 41 | 11 | 3 | 6 |
| Do | None | | 1,739 | 40 | 196 | 186 |
| PART II | | | | | | |
| 33 parts ethylene glycol, 67 parts water | Triethanolamine | 0.25 | 555 | 333 | 85 | 176 |

[1] Parts by volume per 100 parts by volume of the liquid.   [2] Parts by weight per 100 parts by weight of liquid.   [3] Average of two runs.

*Example IV*

The 200-hour corrosion test was used here with liquids containing organosilicon inhibitors having different functionality. The test data is tabulated in Table IV. With the exception indicated in the table, the liquid contained 0.33 part by weight of the inhibitor per 100 parts by weight of a liquid obtained by mixing 33 parts by volume of ethylene glycol and 66 parts by volume of water. The data recorded is an average of two test runs. The results show that good protection is obtained with organosilicon inhibitors of different functionality containing a group represented by Formula 1.

Example VI

The 200-hour corrosion test was employed to test liquids containing polymeric inhibitors used in this in-

TABLE VI

| Inhibitor | pH [6] | | RA [3] | | Corrosion, mg. per 9 sq. in. | | | | S.S.[4] |
|---|---|---|---|---|---|---|---|---|---|
| | I | F | I | F | Fe | Al | BR | Cu | |
| $[NH_2(CH_2)_3SiO_{1.5}]$ [1] | 10.3 | 9.2 / 9.2 | 38 | 12 / 8 | 15 / 26 | 16 / 15 | 8 / 10 | 10 / 12 | 5.5 / 5 |
| $[NH_2(CH_2)_4SiO_{1.5}]$ [1] | 10.3 | 9.6 / 9.6 | 31 | 15 / 10 | 18 / 19 | 22 / 24 | 9 / 7 | 10 / 7 | 5.5 / 5.5 |
| $[NH_2(CH_2)_3SiO_{1.5}]$ [2] $[C_6H_5SiO_{1.5}]$ | 9.2 | 9.4 / 9.4 | 12 | 7 / 7 | 52 / 70 | 5 / 1 | 8 / 7 | 11 / 9 | 5 / 5 |
| $[NH_2(CH_2)_3SiO_{1.5}]$ [2] $[C_6H_5SiO_{1.5}]$ | 9.5 | 9.7 / 9.7 | 7 | 13 / 11 | 56 / 74 | 1 / 1 | 7 / 4 | 10 / 5 | 5.5 / 5.5 |
| $[NH_2(CH_2)_3SiO_{1.5}]$ [1] | 9.7 | 9.7 / 9.7 | 14 | 12 / 11 | 22 / 24 | 0 / 3 | 3 / 4 | 4 / 6 | 5.5 / 6 |
| $[NH_2(CH_2)_3SiO_{1.5}]$ [2] $[CH_3SO_{1.5}]$ | 9.8 | | 21 | | 26 / 34 | 4 / 3 | 4 / 4 | 4 / 6 | 5.5 / 6 |
| $[NH_2(CH_2)_3SiO_{1.5}]$ [2] | 9.7 | 9.6 / 9.6 | 16 | 12 / 13 | 59 / 58 | 2 / 3 | 5 / 4 | 7 / 5 | 5 / 5 |
| $[NH_2(CH_2)_3SiO_{1.5}]$ [2] | 9.8 | 9.9 / 10.0 | 18 | 16 / 17 | 22 / 19 | 2 / 2 | 5 / 6 | 4 / 4 | 5 / 5 |
| $[NH_2(CH_2)_3SiO_{1.5}]$ [5] $[MeSiO_{1.5}]$ | 10.1 | 7.7 / 7.7 | 14 | 2 / 2 | 247 / 108 | 105 / 48 | 12 / 9 | 18 / 20 | 5 / 5 |

[1] Homopolymer composed of these groups.
[2] Copolymer composed of equal numbers of each of these groups.
[3] Reserve alkalinity (I is initial value and F is final value).
[4] Solder spot rating.
[5] Copolymer composed of twice as many $NH_2(CH_2)_3SiO_{1.5}$ groups as $MeSiO_{1.5}$ groups; 1.0 parts by weight of inhibitor used in this run.
[6] I is initial value and F is final value.

TABLE IV

| Inhibitor | Corrosion, mg. wt. loss/9 sq. in. | | | |
|---|---|---|---|---|
| | Fe | Al | BR | Cu |
| Gamma-aminopropyltriethoxysilane | 38 | 25 | 4 | 6 |
| Gamma-aminopropylpolysiloxane [1] | 39 | 155 | 12 | 38 |
| Gamma-aminopropylmethyl cyclic siloxanes (mixture) | 62 | 165 | 14 | 36 |
| Gamma-aminopropylmethylsiloxane cyclic tetramer | 26 | 206 | 7 | 11 |
| Delta-aminobutyltriethoxysilane | 40 | 11 | 3 | 5 |
| Delta-aminobutylmethyldiethoxysilane | 38 | 47 | 5 | 6 |
| Delta-aminobutylmethyl cyclic tetramer | 13 | 51 | 6 | 7 |
| Epsilon-aminopentyltriethoxysilane | 42 | 5 | 3 | 4 |
| Beta-aminophenylethylmethyldiethoxysilane | 439 | 103 | 8 | 10 |
| None | 1,739 | 40 | 196 | 186 |

[1] 0.66 part by weight per 100 parts by weight of the liquid inhibitor used in this experiment.

Example V

The 200-hour corrosion test was employed to show resistance to corrosion afforded by the secondary and tertiary amines used as inhibitors in this invention and a comparison of such amines with a primary amine used in this invention as inhibitors. The results of these tests are described in Table V below. It will be noticed from these tests that, although secondary and tertiary amines perform satisfactorily, inhibition generally seems to decrease as N-substitution is increased. Tests were run with liquids containing 0.33 part of weight of inhibitor per 100 parts by weight of a liquid produced by mixing 33 parts by volume of ethylene glycol and 67 parts by volume of water. The results are average of two runs.

TABLE V

| Inhibitor | Corrosion, mg. wt. loss/9 sq. in. | | | |
|---|---|---|---|---|
| | Fe | Al | BR | Cu |
| $NH_2(CH_2)_3Si(OC_2H_5)_3$ | 38 | 25 | 4 | 6 |
| $C_2H_5OOCC_2H_4NH(CH_2)_3Si(OC_2H_5)_3$ | 415 | 193 | 135 | 69 |
| $(C_2H_5OOCC_2H_4)_2N(CH_2)_3Si(OC_2H_5)_3$ | 445 | 191 | 165 | 153 |
| $H_2NC_3H_6NH(CH_2)_4Si(OC_2H_5)_3$ | 36 | 154 | 10 | 30 |
| None | 1,739 | 40 | 196 | 186 | vention. The test liquids contained 0.33 part by weight of the indicated inhibitor per 100 parts by weight of a solution formed by mixing 33 parts by volume of ethylene glycol and 66 parts by volume of water. The test results are tabulated on Table VI. The test data show that the polymers provided excellent protection. The homopolymers were somewhat better in protecting iron, whereas the copolymers were markedly better in protecting aluminum.

Example VII

Liquids that had been treated according to the process of this invention were stored for five months, both at room temperature and at 50° C. At the end of the storage period the compositions were inspected to determine if any change in color had occurred and if any precipitates had formed. The results are shown on Table VII. The results demonstrate the good shelf life of such liquids. No precipitate was observed in the tests.

TABLE VII

| Inhibitor | Amount [1] | Room temp. | 50° C. |
|---|---|---|---|
| $NH_2(CH_2)_4Si(OC_2H_5)_3$ | 1.0 | Clear and colorless. | Clear and slightly yellow. |
| $NH_2(CH_2)_4Si(OC_2H_5)_3$ | 0.5 | ---do--- | Do. |

[1] Parts by weight per 100 parts by weight of a liquid obtained by mixing 33 parts by volume of ethylene glycol and 66 parts by volume of water.

Example VIII

Solutions of ethylene glycol and water (obtained by mixing 33 parts by volume of ethylene glycol and 66 parts by volume of water), with and without an inhibitor, were tested in the cooling system of a Ford V-8 engine in a test car. The car was used in normal operation. Weighed strips of copper, aluminum and iron and a brass coupon on which was a spot of solder were immersed in the coolant. At the end of the test the strips were cleaned and reweighed. The water used contained 100 p.p.m. each of chloride sulfate and bicarbonate ions. Samples of the liquids were withdrawn and analyzed during the test. The results appear in Table VIII. Good protection was also afforded iron, copper and solder by the inhibitor. The inhibited solution maintained a pH over 7 and good reserve alkalinity.

TABLE VIII

| Test miles | Inhibited solution [1] (mg./4.5 sq. in.) aluminum | Uninhibited solution (mg./4.5 sq. in.) aluminum |
|---|---|---|
| 4,627 | 24 | 92 |
| 6,604 | 98 | 118 |

[1] 1 part by weight of delta-aminobutyltriethoxysilane per 100 parts by weight of the glycol.

Example IX

Solutions of ethylene glycol and water (obtained by mixing 33 parts by volume of the glycol and 66 parts by volume of water) with and without an inhibitor, were tested in the cooling system of a Ford V-8 engine in a test car that was used in normal operation. Weighed strips of copper, aluminum and iron and a brass coupon on which was a spot of solder were immersed in the coolant. At the end of the test the strips were cleaned and reweighed. The water used contained 100 p.p.m. each of chloride, sulfate and bicarbonate ions. Samples of the solutions were analyzed. The results appear in Tables IX-A and IX-B and show the marked improvement in iron protection resulting from the practice of this invention.

TABLE IX-A.—SOLUTION ANALYSIS

| Test mileage | Experimental formula [1] | | Uninhibited water glycol solution | |
|---|---|---|---|---|
| | pH | RA | pH | RA |
| 0 | 10.1 | 12 | 7.1 | 0 |
| 871 | 9.5 | 5 | 6.5 | 0 |

TABLE IX-B.—CORROSION

| Test mileage | Experimental formula [1] wt. loss, mg./4.5 sq. in. | | | | Uninhibited water glycol solution wt. loss, mg./4.5 sq. in. | | | |
|---|---|---|---|---|---|---|---|---|
| | Fe | Al | Cu | S.S. | Fe | Al | Cu | S.S. |
| 871 | 2 | 4 | 5 | 6 | 69 | | 6 | 5.5 |

[1] 1 part by weight of $H_2N(CH_2)_4Si(OC_2H_5)_3$ per 100 parts by weight of the glycol.

Example X

Mild steel specimens were immersed in 1 N $H_2SO_4$ aqueous solutions to which had been added the indicated amount of delta-aminobutyltriethoxysilane as an inhibitor. The test was performed over a period of 48 hours at 20° C. and the results are given on Table X. The test procedure used is described in Ind. Eng. Chem. 28, 159 (1936), Mann et al. This test simulates the conditions obtaining in pickling processes for removing scale from iron employing acidic solutions. The results demonstrate the usefulness of this invention in protecting base metals treated with pickling solutions.

TABLE X

| Amount of inhibitor [1] | Weight loss of steel [2] | Percent protection [3] |
|---|---|---|
| None | 113 | ---- |
| 0.5 | 58 | 48.5 |
| 1.0 | 56 | 50.5 |

[1] Parts by weight per 100 parts by weight of acid solution.
[2] Average of two runs in gm. per 15 sq. cm.
[3] Percent protection = $\left(\frac{113 - \text{wt. loss}}{113}\right) \times 100$

Example XI

The corrosion inhibiting properties of an inhibitor used in this invention $[NH_2(CH_2)_4Si(OC_2H_5)_3]$ were tested. The 200-hour corrosion test was used except for one run where instead of aerating the test solution, argon was bubbled into the system to simulate actual conditions since in actual use of such solutions little air might be available. The results obtained are shown on Table XI. Excellent iron, copper and brass protection was obtained in both runs.

TABLE XI

| Type | Amount [1] | pH | | RA | | Wt. losses, mg./9 sq. in. | | | | S.S. |
|---|---|---|---|---|---|---|---|---|---|---|
| | | I | F | I | F | Fe | Al | BR | Cu | |
| $NH_2(CH_2)_4Si(OEt)_3$ (not aerated, argon atmosphere) | 0.33 | 10.1 | 9.5 / 9.5 | 14 | 8 / 9 | 3 / 3 | 87 / 94 | 3 / 2 | 4 / 4 | 6 / 5 |
| $NH_2(CH_2)_4Si(OEt)_3$ | 0.33 | 10.3 | 9.8 / 9.7 | 13 | 7 / 8 | 41 / 40 | 15 / 8 | 3 / 3 | 6 / 5 | 6 / 6 |
| None | | 6.9 | 4.9 | 0 | Acid | 1,739 | 40 | 196 | 186 | 4.5 |

[1] Parts by weight per 100 parts by weight of a liquid obtained by mixing 33 parts by volume of ethylene glycol and 66 parts by volume of water.

Example XII

The effect of varying the amount of inhibitor used in this invention was investigated, using the 200-hour corrosion test. The liquid used was obtained by mixing the 33 parts by volume of ethylene glycol and 66 parts by volume of water. The results obtained are shown on Table XII. The results show that good corrosion protection is obtained over a wide range of inhibitor concentrations.

TABLE XII
[A. Delta-aminobutyltriethoxysilane]

| Amount of inhibitor [1] | pH | RA | | Wt. losses, mg./9 sq. in. | | | | S.S. |
|---|---|---|---|---|---|---|---|---|
| | | I | F | Fe | Al | BR | Cu | |
| 0.1 | 9.4 | 7.5 / 7.8 | 1 | 0 / 0 | 315 / 213 | 135 / 123 | 58 / 64 | 61 / 63 | 5 / 4½ |
| 0.5 | 10.2 | 9.1 / 9.1 | 6 | 1 / 1 | 109 / 103 | 33 / 29 | 3 / 3 | 4 / 3 | 5½ / 5½ |
| 1.0 | 10.3 | 9.8 / 9.7 | 13 | 7 / 8 | 41 / 40 | 15 / 8 | 3 / 3 | 6 / 5 | 6 / 6 |
| 1.5 | 10.7 | 10.5 / 10.4 | 18 | 10 / 8 | 27 / 26 | 12 / 9 | 1 / 3 | 3 / 11 | 6 / 6 |
| 2.0 | 10.6 | 9.8 / 9.8 | 30 | 20 / 20 | 14 / 15 | 11 / 12 | 7 / 5 | 8 / 6 | 5½ / 5½ |
| 3.0 | 10.6 | 9.6 / 9.7 | 44 | 3 / 8 | 20 / 26 | 175 / 95 | 8 / 7 | 11 / 12 | 5 / 5 |

[B. Delta-aminobutylmethylsiloxane cyclic tetramer]

| 0.1 | 10.3 | 6.7 / 6.5 | 2 | 0 / 0 | 395 / 391 | 30 / 40 | 63 / 60 | 49 / 47 | 5 / 5 |
| 0.5 | 10.6 | 10.3 / 10.3 | 13 | 11 / 11 | 76 / 54 | 16 / 18 | 5 / 3 | 6 / 4 | 5½ / 5½ |
| 1.0 | 10.8 | 10.4 / 10.5 | 28 | 19 / 22 | 12 / 14 | 47 / 55 | 5 / 6 | 10 / 5 | 5 / 5½ |
| 2.0 | 10.6 | 10.3 / 10.3 | 60 | 60 / 57 | 6 / 6 | 80 / 132 | 7 / 8 | 6 / 7 | 5½ / 5½ |
| 3.0 | 10.6 | 10.5 / 10.5 | 80 | 77 / 66 | 8 / 7 | 188 / 195 | 10 / 15 | 9 / 11 | 5½ / 5½ |

[1] Parts by weight of the inhibitor per 100 parts by weight of the glycol.

Example XIII

A solution was formed containing 1.0 g. of $$Me_2N(CH_2)_3Si(OC_2H_5)_3$$

10 cc. of ethylene glyol and 20 cc. of water containing 100 parts per million each of chloride, sulfate and bicarbonate ions. A strip of freshly scoured carbon steel (strip A) was immersed in the solution and the solution was aerated rapidly for 24 hours. A similar steel strip (strip B) was immersed in a similar solution containing no inhibitor and the solution was aerated rapidly for 24 hours. At the end of the test strip A was found to be bright over most of its surface area whereas strip B appeared to be seriously rusted over most of its surface area. Both strips were then gently scoured to remove rust and then weighed. Strip A was found to have undergone a weight loss of 0.05% whereas strip B had had a weight loss of 0.13%.

Example XIV

A solution was formed containing 10 cc. of ethylene glycol, 20 cc. of water containing 100 parts per million each of sulfate, chloride and bicarbonate ions and 0.1 g. of a siloxane copolymer. The siloxane copolymer was an oil composed of 35 parts by weight of N,N-di(beta-hydroxyethyl)-delta-aminobutylmethylsiloxy group [i.e. $(HOCH_2CH_2)_2N(CH_2)_3SiMeO$— groups] and 65 parts by weight of dimethylsiloxy groups per 100 parts by weight of the siloxane groups in the copolymer. A strip of freshly scoured carbon steel (strip A) was immersed in this solution and the solution was aerated for 24 hours. A similar steel strip (strip B) was immersed in a similar solution containing no inhibitor that was also aerated for 24 hours. Both strips were then scoured gently to remove the rust and weighed. Strip A had had a weight loss of 0.11% whereas strip B had had a weight loss of 0.19%.

Example XV

A mixture was formed containing 25 cc. of water that contained 100 parts per million each of chloride, sulfate and bicarbonate ions and 0.1 gram of a hydroxy-end-blocked delta-aminobutylmethylpolysiloxane

[i.e. $HO(NH_2(CH_2)_4SiMeO)_xH$]

that had a viscosity of 537 centipoises and that contained 4 parts by weight of hydroxyl groups per 100 parts by weight of the siloxane. A strip of freshly scoured carbon steel (strip A) was immersed in the mixture and the mixture was aerated for 24 hour. A similar steel strip (strip B) was immersed in water containing the same ions but no inhibitor and the water was aerated for 24 hours. Both strips were then scoured gently to remove rust and weighed. Strip A had had a weight loss of 0.15% whereas strip B had had a weight loss of 0.77%.

Example XVI

Solutions containing the indicated organosilicon inhibitors were evaluated in the 200-hour corrosion test. The solution contained 100 parts by weight ethylene glycol and 180 parts by weight water. The results are shown on Table XIII. The results demonstrate the effectiveness of the organosilicon inhibitors in retarding corrosion, especially the corrosion of aluminum.

Other organosilicon inhibitors that are useful in the process of this invention are N-beta-aminoethyltrimethoxysilane, N-gamma-aminopropyltrimethoxysilane, beta-(p-aminomethylphenyl)-ethyl-triethoxysilane and the alkoxy-containing amino-organosiloxanes produced by the partial hydrolysis and condensation of any of these silanes.

What is claimed is:

1. A process for inhibiting the corrosion of a metal selected from the group consisting of magnesium and the metals below magnesium in the electromotive series that come in contact with a corrosive aqueous liquid selected from the group consisting of water having dissolved therein inorganic solutes and water having dissolved therein water-soluble organic compounds, which process comprises providing in the corrosive liquid a corrosion inhibiting amount of an organosilicon compound selected from the group consisting of (I) silanes represented by the formula:

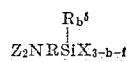

$$Z_2NRSiX_{3-b-f}^{R_b^5}$$

wherein:
(a) Z is a member selected from the group consisting of the hydrogen atom, the monovalent hydrocarbon groups, the substituted monovalent hydrocarbon groups containing a substituent selected from the group consisting of the amino, hydroxyl, amido, ester, cyano and hydrocarbonoxy groups and divalent groups that are derived from oxirane compounds by the opening of the oxirane ring and that link the nitrogen atom to the silicon atom through a carbon to carbon to oxygen linkage;
(b) R is a divalent hydrocarbon group containing at least three carbon atoms;
(c) the $Z_2N$— group is attached to at least the third carbon removed from the silicon atom;
(d) $R^5$ is a member selected from the group consisting of the monovalent hydrocarbon groups and the $H_2NC_nH_{2n}$— groups where $n$ has a value of at least three;
(e) $b$ has a value from 0 to 2;
(f) $f$ has a value from 0 to 2 and represents the number of said divalent groups represented by Z;
(g) $3-b-f$ has a value from 1 to 3; and
(h) X is a member selected from the group consisting of the alkoxy and aroxy groups;

(II) siloxanes consisting essentialy of siloxane groups represented by the formula:

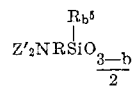

$$Z'_2NRSiO_{\frac{3-b}{2}}^{R_b^5}$$

wherein:
(a) Z' is a member selected from the group consisting of the hydrogen atom, the monovalent hydrocarbon groups and the substituted monovalent hydrocarbon groups containing a substituent selected from the group consisting of

TABLE XIII

| Organosilicon Compounds | Amount [1] | pH | | RA | | Wt. losses (mg./9 in.²) | | | | S.S. |
|---|---|---|---|---|---|---|---|---|---|---|
| | | I | F | I | F | Fe | Al | BR | Cu | |
| m-$NH_2CH_2C_6H_4Si(OC_2H_5)_3$ | 1.0 | 9.7 | 9.6 / 9.7 | 13 | 5 / 6 | 37 / 39 | 1 / 2 | 3 / 4 | 1 / 0 | 5 / 5 |
| $NH_2C_2H_4(Me)CH_2Si(OC_2H_5)_2NH_2(CH_2)_5$ | 1.0 | 11 | 10.6 / 10.6 | 25 | 17 / 20 | 14 / 9 | 1 / 1 | 2 / 2 | 3 / 2 | 5.5 / 5.5 |
| p-$NH_2CH_2C_6H_4Si(OC_2H_5)_3$ | 1.0 | 9.4 | 9.8 / 9.7 | 14 | 8 / 8 | 81 / 63 | 0 / 0 | 2 / 1 | 3 / 1 | 5 / 5 |

[1] Parts by weight per 100 parts by weight of the aqueous glycol.

amino, hydroxyl, amido, ester, cyano and hydrocarbonoxy groups;
(b) R is a divalent hydrocarbon group containing at least three carbon atoms;
(c) the Z′$_2$N— group is attached to at least the third carbon removed from the silicon atom;
(d) R$^5$ is a member selected from the group consisting of the monovalent hydrocarbon groups and the H$_2$NC$_n$H$_{2n}$— groups where $n$ has a value of at least three; and
(e) $b$ has a value from 0 to 2; and
(III) siloxanes consisting essentially of both (1) the above-defined siloxane groups and (2) groups represented by the formula:

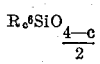

wherein R$^6$ is a monovalent hydrocarbon group and $c$ has a value from 1 to 3.

2. The process of claim 1 wherein the corrosive aqueous liquid is water having dissolved therein inorganic solutes and wherein the inorganic solute contains sulfate ions.

3. The process of claim 1 wherein the corrosive aqueous liquid is water having dissolved therein inorganic solutes and wherein the inorganic solute contains bicarbonate ions.

4. The process of claim 1 wherein the organosilicon compound is N-beta-aminoethyl-gamma-aminopropyltriethoxysilane.

5. A process for inhibiting the corrosion of iron that comes in contact with corrosive water containing chloride ions, which process comprises providing in the water a corrosion inhibiting amount of an alcohol-soluble silane represented by the formula:

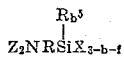

wherein:
(a) Z is a member selected from the group consisting of the hydrogen atom, the monovalent hydrocarbon groups, the substituent monovalent hydrocarbon groups containing a substituent selected from the group consisting of the amino, hydroxyl, amido, ester cyano and hydrocarbonoxy groups and divalent groups that are derived from oxirane compounds by the opening of the oxirane ring and that link the nitrogen atom to the silicon atom through a carbon to carbon to oxygen linkage;
(b) R is a divalent hydrocarbon group containing at least three carbon atoms;
(c) the Z$_2$N— group is attached to at least the third carbon removed from the silicon atom;
(d) R$^5$ is a member selected from the group consisting of the monovalent hydrocarbon groups and the H$_2$NC$_n$H$_{2n}$— groups where $n$ has a value of at least three;
(e) $b$ has a value from 0 to 2;
(f) $f$ has a value from 0 to 2 and represents the number of said divalent groups represented by Z;
(g) $3-b-f$ has a value from 1 to 3; and
(h) X is a member selected from the group consisting of the alkoxy and aroxy groups, said silane being soluble in said corrosive water.

6. A process for inhibiting the corrosion of aluminum that comes in contact with corrosive water containing chloride ions, which process comprises providing in the water a corrosion inhibiting amount of a siloxane consisting essentially of groups represented by the formula:

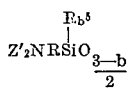

wherein:
(a) Z′ is a member selected from the group consisting of the hydrogen atom, the monovalent hydrocarbon groups, the substituent monovalent hydrocarbon groups containing a substituent selected from the group consisting of amino, hydroxyl, amido, ester, cyano and hydrocarbonoxy groups;
(b) R is a divalent hydrocarbon group containing at least three carbon atoms;
(c) the Z′$_2$N— group is attached to at least the third carbon removed from the silicon atoms;
(d) R$^5$ is a member selected from the group consisting of the monovalent hydrocarbon groups and the H$_2$NC$_n$H$_{2n}$— where $n$ has a value of at least three; and
(e) $b$ has a value from 0 to 2, said siloxane being soluble in said corrosive water.

7. A process for inhibiting the corrosion of aluminum that comes in contact with corrosive water containing chloride ions, which process comprises providing in the water a corrosion inhibiting amount of a siloxane consisting essentially of groups represented by the formula:

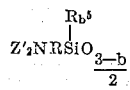

wherein:
(a) Z′ is a member selected from the group consisting of the hydrogen atom, the monovalent hydrocarbon groups and the substituted monovalent hydrocarbon groups containing a substituent selected from the group consisting of amino, hydroxyl, amido, ester, cyano and hydrocarbonoxy groups;
(b) R is a divalent hydrocarbon group containing at least three carbon atoms;
(c) the Z′$_2$N group is attached to at least the third carbon removed from the silicon atoms;
(d) R$^5$ is a member selected from the group consisting of the monovalent hydrocarbon groups and the H$_2$NC$_n$H$_{2n}$— where $n$ has a value of at least three; and
(e) $b$ has a value from 0 to 2 and groups represented by the formula:

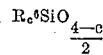

wherein R$^6$ is a monovalent hydrocarbon group and $c$ has a value from 1 to 3, said siloxane being soluble in said corrosive water.

8. A process for inhibiting the corrosion of a metal selected from the group consisting of magnesium and the metals below magnesium in the electromotive series that come in contact with corrosive water containing chloride ions, which process comprises providing in the water a corrosion inhibiting amount of an alcohol-soluble siloxane consisting essentially of groups represented by the formula:

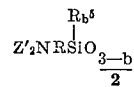

wherein:
(a) Z′ is a member selected from the group consisting of the hydrogen atom, the monovalent hydrocarbon groups and the substituted monovalent hydrocarbon groups containing a substituent selected from the group consisting of amino, hydroxyl, amido, ester, cyano and hydrocarbonoxy groups;
(b) R is a divalent hydrocarbon group containing at least three carbon atoms;
(c) the Z′$_2$N— group is attached to at least the third carbon removed from the silicon atoms;
(d) R$^5$ is a member selected from the group consisting of the monovalent hydrocarbon groups and the H$_2$NC$_n$H$_{2n}$— wherein $n$ has a value of at least three; and (e) $b$ has a value from 0 to 2, said siloxane being soluble in said corrosive water.

9. A process for inhibiting the corrosion of a metal selected from the group consisting of magnesium and the metals below magnesium in the electromotive series that come in contact with corrosive water containing chloride ions, which process comprises providing in the water a corrosion inhibiting amount of an alcohol-soluble siloxane consisting essentially of both (1) groups represented by the formula:

$$Z'_2NRSiO_{\frac{3-b}{2}}^{R_b^5}$$

wherein:
(a) $Z'$ is a member selected from the group consisting of the hydrogen atom, the monovalent hydrocarbon groups and the substituted monovalent hydrocarbon groups containing a substituent selected from the group consisting of amino, hydroxyl, amido, ester, cyano and hydrocarbonoxy groups;
(b) $R$ is a divalent hydrocarbon group containing at least three carbon atoms;
(c) the $Z'_2N$— group is attached to at least the third carbon removed from the silicon atoms;
(d) $R^5$ is a member selected from the group consisting of the monovalent hydrocarbon groups and the $H_2NC_nH_{2n}$— where $n$ has a value of at least three; and
(e) $b$ has a value from 0 to 2; and (2) groups represented by the formula:

$$R_c^6SiO_{\frac{4-c}{2}}$$

wherein $R^6$ is a monovalent hydrocarbon group and $c$ has a value from 1 to 3, said siloxane being soluble in said corrosive water.

10. A process for inhibiting the corrosion of iron that comes in contact with corrosive water containing an organic solute which comprises adding to the water from .0001 part to 10 parts by weight of a siloxane consisting essentially of gamma-aminopropylsiloxy groups per 100 parts by weight of water.

11. A process for inhibiting the corrosion of aluminum which comes in contact with corrosive water containing an organic solute which comprises adding to the water from .0001 part to 10 parts by weight of a siloxane consisting essentially of delta-aminobutylsiloxy groups per 100 parts by weight of water.

12. A process for inhibiting the corrosion of iron which comes in contact with corrosive water containing an organic solute which comprises adding to the water from .0001 part to 10 parts by weight of gamma-aminopropyl-(methyl)siloxane cyclic tetramer per 100 parts by weight of water.

13. A process for inhibiting the corrosion of iron which comes in contact with corrosive water containing an organic solute which comprises adding to the water from .0001 part to 10 parts by weight of gamma-aminopropyltriethoxysilane per 100 parts by weight of water.

References Cited by the Examiner

UNITED STATES PATENTS

| | | | |
|---|---|---|---|
| 2,715,133 | 8/1955 | Speier | 260—448.2 |
| 2,762,823 | 9/1956 | Speier | 260—448.2 |
| 2,833,802 | 5/1958 | Merker | 252—389 |
| 2,881,184 | 4/1959 | Pike | 260—448.2 |
| 2,926,108 | 2/1960 | Anderson | 252—8.55 |
| 3,017,353 | 1/1962 | Jewell | 252—8.55 |
| 3,069,451 | 12/1962 | Fritz | 260—448.2 |
| 3,085,908 | 4/1963 | Morehouse et al. | 260—448.2 |

JULIUS GREENWALD, *Primary Examiner.*